United States Patent
Nguyen

(10) Patent No.: US 11,030,830 B1
(45) Date of Patent: Jun. 8, 2021

(54) CUSTOMIZED OPERATING POINT

(71) Applicant: Lytx, Inc., San Diego, CA (US)

(72) Inventor: Vincent Nguyen, San Diego, CA (US)

(73) Assignee: Lytx, Inc., San Diego, CA (US)

(*) Notice: Subject to any disclaimer, the term of this patent is extended or adjusted under 35 U.S.C. 154(b) by 333 days.

(21) Appl. No.: 16/253,131

(22) Filed: Jan. 21, 2019

(51) Int. Cl.
*G07C 5/08* (2006.01)
*G06F 16/9035* (2019.01)
*G06F 16/909* (2019.01)

(52) U.S. Cl.
CPC ......... *G07C 5/0841* (2013.01); *G06F 16/909* (2019.01); *G06F 16/9035* (2019.01); *G07C 5/0808* (2013.01); *G07C 5/0816* (2013.01)

(58) Field of Classification Search
CPC .. G07C 5/0841; G07C 5/0816; G07C 5/0808; G06F 16/9035; G06F 16/909
See application file for complete search history.

(56) References Cited

U.S. PATENT DOCUMENTS

2014/0210625 A1* 7/2014 Nemat-Nasser ....... G08B 21/06
340/575

* cited by examiner

*Primary Examiner* — Michael V Kerrigan
(74) *Attorney, Agent, or Firm* — Van Pelt, Yi & James LLP

(57) ABSTRACT

A system for indicating an operating point includes and interface and a processor. The interface is to receive user information, user reviewing feedback, and reviewing metadata. The processor is configured to determine a recommendation for an operating point based at least in part on the user information, the user reviewing feedback, and the reviewing metadata and provide an indication of an adjustment to the operating point to a vehicle event recorder. The adjustment is based at least in part on the recommendation for the operating point.

23 Claims, 8 Drawing Sheets

CUSTOMIZED OPERATING POINT

BACKGROUND OF THE INVENTION

A monitoring system collects data and uses the data to monitor its environment. Data is collected using a data collection system including one or more sensors. For example, a monitoring system comprises a vehicle event recorder mounted on a vehicle. The monitoring system analyzes the collected data to determine anomalous events and uploads some data based on the anomalous event determination. Different organizations utilizing the monitoring system for monitoring of different environments require different parameters controlling the collection, event detection, and uploading of data, however, it is difficult to determine the optimal parameter values across a range of organization types and applications. This creates a problem where the optimal parameters are typically not used and so the system does not operate efficiently for a user.

BRIEF DESCRIPTION OF THE DRAWINGS

Various embodiments of the invention are disclosed in the following detailed description and the accompanying drawings.

DETAILED DESCRIPTION

Figure 1:
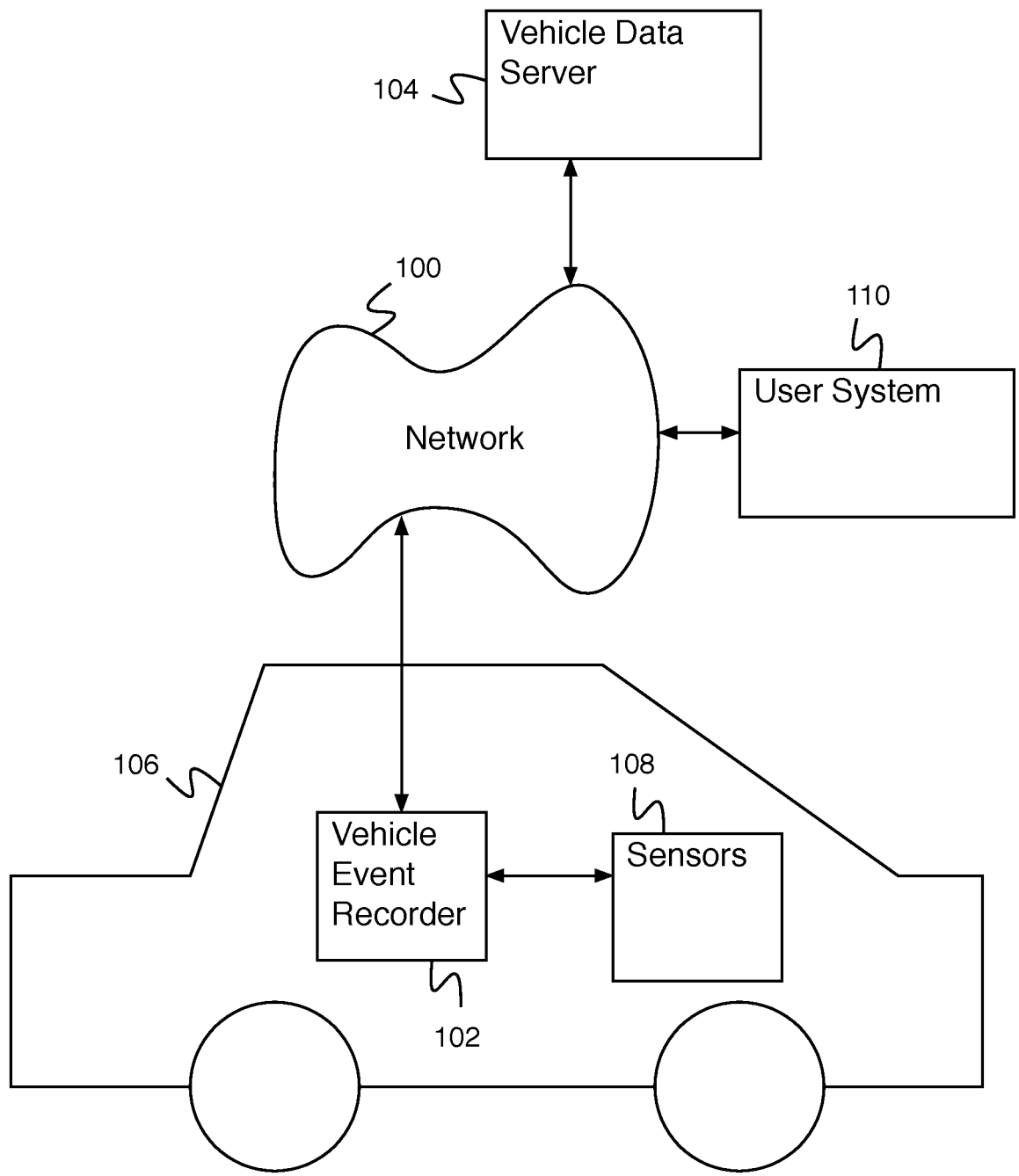
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for indicating an operating point comprises an interface configured to receive user information, receive user reviewing feedback, and receive reviewing metadata, and a processor configured to determine a recommendation for an operating point based at least in part on the user information, the user reviewing feedback, and the reviewing metadata. The system for indicating an operating point additionally comprises a processor configured to determine a recommendation for an operating point based at least in part on the user information the user reviewing feedback, and the reviewing metadata, and provide an indication of the adjustment to the operating point to a vehicle event recorder. The adjustment to the operating point is based at least in part on the recommendation for the operating point. The system for indicating an operating point additionally comprises a memory coupled to the processor and configured to provide the processor with instructions.

A data collection and reviewing system comprises a system for indicating and determining an operating point for data collection, event detection, and data uploading. The data collection and reviewing system comprises a vehicle event recorder system mounted on a vehicle. The vehicle event recorder system collects data, processes the data to identify anomalous events, and uploads the data to a vehicle data server based at least in part on the anomalous event determination. Data collection parameters, anomalous event detection parameters, and data upload parameters are set by an operating point controlled by the vehicle data server. The operating point is determined by a model using user information as input. For example, the user information comprises an organization size, an organization industry, organization sector, organization hours of operation, organization location, etc. In some cases, the model comprises a machine learning model that is trained on a set of historical data including user information, user reviewing feedback (e.g., indications from the user of whether the operating point is set correctly), and reviewing metadata (e.g., data collected by the data viewing system indicating user behaviors). As user reviewing feedback and reviewing metadata are collected, the model is updated and used to more accurately predict an operating point. The system for indicating an operating point improves the data collection and reviewing system by automatically determining an appropriate operating point for a user (e.g., of a set of distinct users with distinct data collection needs). The system adjusts to the needs of different users or the changing needs of a given user by updating the model based on user feedback.

FIG. 1 is a block diagram illustrating an embodiment of a system including a vehicle event recorder. In the example shown, vehicle event recorder 102 is mounted in a vehicle (e.g., a car, a truck, a trailer associated with a semi truck, a van, a bus, a commercial vehicle, etc.). Vehicle event recorder 102 is in communication with sensors 108. Sensors 108 comprises a set of sensors—for example, one or more video recorders, audio recorders, accelerometers, gyroscopes, vehicle state sensors, proximity sensors, a global positioning system (GPS), outdoor temperature sensors, moisture sensors, laser line tracker sensors, etc. Vehicle state sensors comprise internal vehicle state sensors—for example, a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location—for example, the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., there is limited space behind the rear view mirror) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks—for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, and/or a cellular data network has a high cost, etc.). In some embodiments, network 100 has a different cost at different times (e.g., a higher cost during the day and a lower cost at night).

Vehicle event recorder 102 communicates with vehicle data server 104 via network 100. Vehicle event recorder 102 stores, processes, and transmits data using an operating point. For example, an operating point indicates data collection parameters (e.g., sensors to collect data from, data bit rate, how often to collect data, etc.), event detection parameters (e.g., events to detect, custom events, event detection thresholds, etc.), uploading parameters (e.g., data length around an event for uploading, number of events per event type to upload, data bitrate for uploading, data priority for uploading, etc.), or any other appropriate parameters. Vehicle data server 104 receives data, processes data, stores data, requests more data, provides stored data, etc. Vehicle data server 104 comprises a system for indicating an operating point. Vehicle data server 104 determines an operating point and provides an operating point indication to vehicle event recorder 102. Vehicle data server 104 comprises an interface configured to receive user information (e.g., information describing an individual or organization using a vehicle event recorder system), receive user reviewing feedback (e.g., indications from a user describing their satisfaction with the operating point), and receive reviewing metadata (e.g., metadata collected by a user data viewing system describing user actions). Vehicle data server 104 additionally comprises a processor configured to determine a recommendation for an operating point based at least in part on the user information, the user reviewing feedback, and the reviewing metadata, and provide an indication of the adjustment to the operating point to a vehicle event recorder.

User system 110 communicates with vehicle data server 104 via network 100. User system 110 comprises a user system for use by a user. For example, user system 110 comprises a system for requesting data from vehicle data server 104, providing data to a user for viewing, receiving a request for user reviewing feedback, providing user reviewing feedback, receiving a recommendation for an operating point, providing an adjustment to an operating point, etc.

Figure 2:
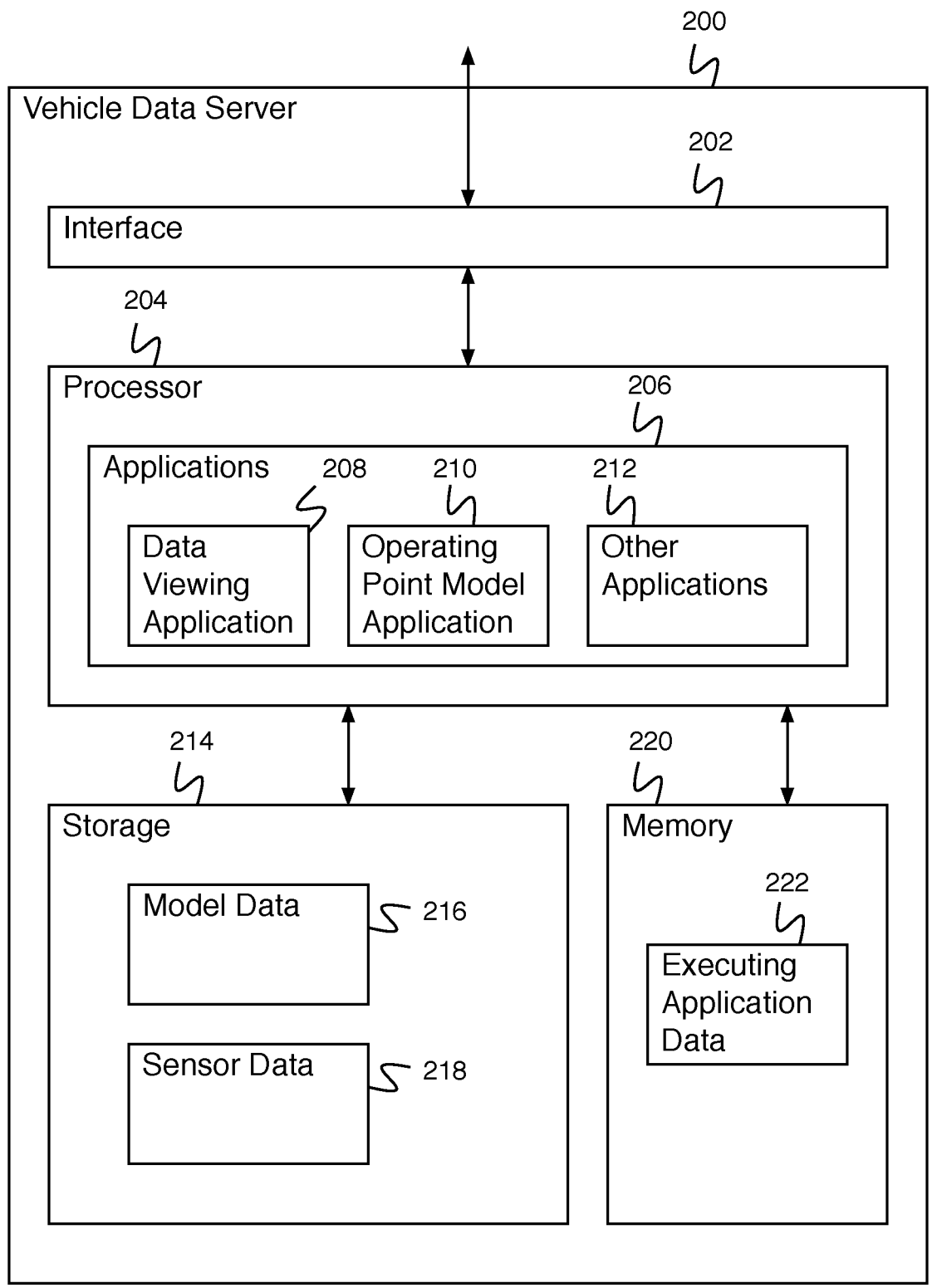
FIG. 2 is a block diagram illustrating an embodiment of a vehicle data server.

FIG. 2 is a block diagram illustrating an embodiment of a vehicle data server. In some embodiments, vehicle data server 200 comprises vehicle data server 104 of FIG. 1. In the example shown, vehicle data server 200 comprises interface 202. Interface 202 comprises an interface for communicating with external systems using a network. For example, interface 202 comprises an interface for communicating with a vehicle event recorder (e.g., for receiving data, for providing an operating point, etc.), an administrator system, a user system, etc. Processor 204 comprises a processor for executing applications 206. Applications 206 comprises data viewing application 208, operating point model application 210, and other applications 212. Data viewing application 208 comprises an application for providing data (e.g., data captured by a vehicle event recorder) for viewing, for capturing viewing metadata, for requesting user reviewing feedback, for receiving user reviewing feedback, etc. Operating point model application 210 comprises an application for building a model for determining an operating point and using the model to determine an operating point. For example, operating point model application 210 receives user information, user reviewing feedback, and reviewing metadata, determines a recommendation for an operating point based at least in part on the user information, the user reviewing feedback, and the reviewing metadata, and provides an indication of the adjustment to the operating point to a vehicle event recorder. Other applications 212 comprise any other appropriate applications (e.g., a communications application, a chat application, a web browser application, a document preparation application, a data storage and retrieval application, a user interface application, a data analysis application, etc.). Vehicle data server 200 additionally comprises storage 214. Storage 214 stores model data 216 and sensor data 218. Model data 216 comprises data for building a model for determining an operating point (e.g., user information, user reviewing feedback, and reviewing metadata) and model data (e.g., data describing a built model). Sensor data 218 comprises data collected by one or more sensors (e.g., sensors 108 of FIG. 1). For example, sensor data 218 comprises sensor data collected using an operating point. Vehicle data server 200 additionally comprises memory 220. Memory 220 stores executing application data 222 comprising data associated with applications 206.

Figure 3:
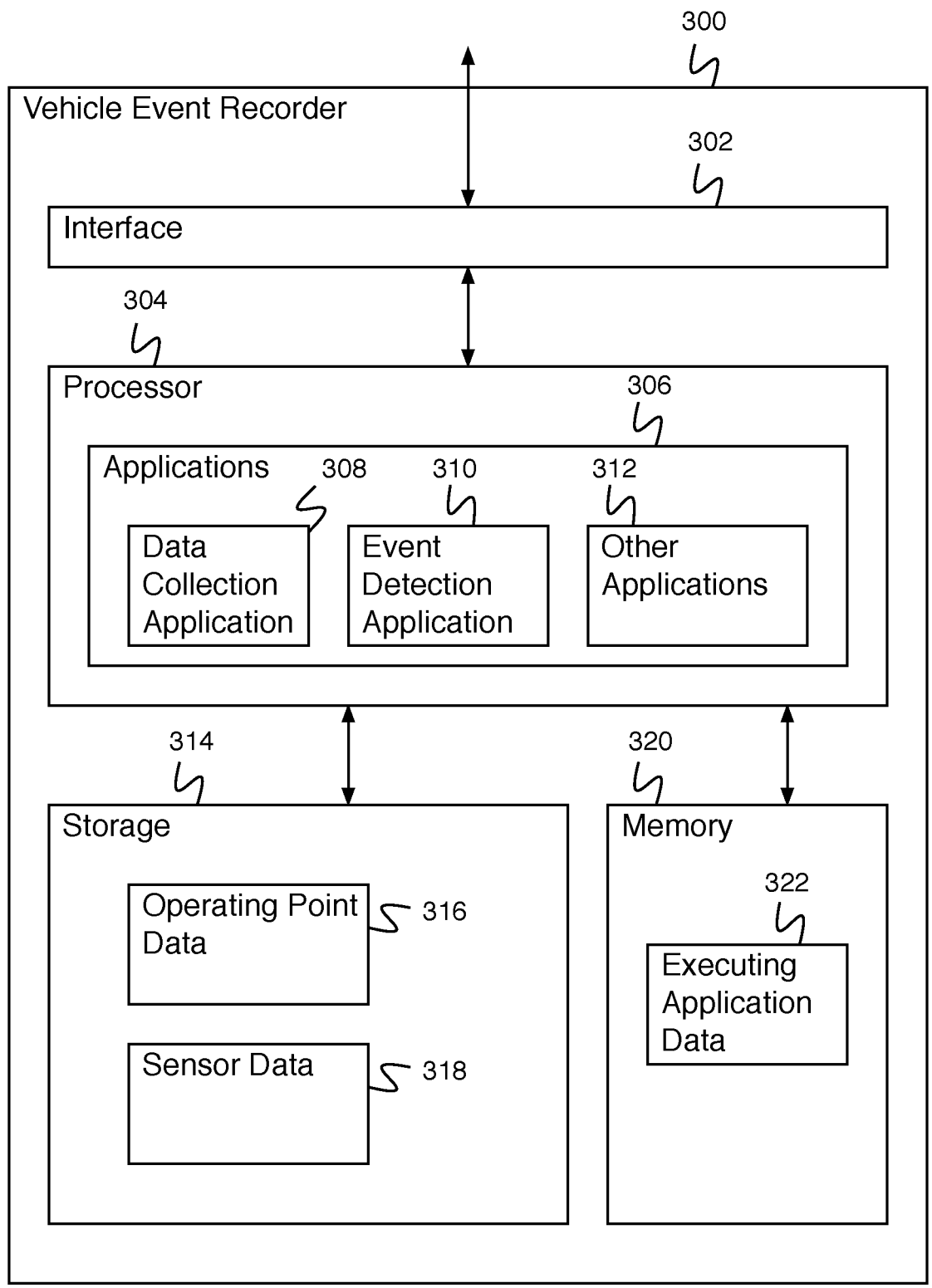
FIG. 3 is a block diagram illustrating an embodiment of a vehicle event recorder.

FIG. 3 is a block diagram illustrating an embodiment of a vehicle event recorder. In some embodiments, vehicle event recorder 300 of FIG. 3 comprises vehicle event recorder 102 of FIG. 1. In the example shown vehicle event recorder 300 comprises interface 302. Interface 302 is for communicating with external systems using a network. For example, interface 302 is for communicating with a vehicle data server (e.g., for providing data, for receiving an operating point, etc.), an administrator system, a user system, sensors, etc. Processor 304 comprises a processor for executing applications 306. Applications 306 comprises data collection application 308, event detection application 310, and other applications 312. Data collection application 308 comprises an application for interacting with one or more sensor systems to receive and store data. Data collection application 308 utilizes operating point information for configuring data collection. For example, the operating point comprises data parameters (e.g., comprising data length, data quality, and/or sensor type, etc.). Data collection application 308 stores sensor data 318. Event detection application 310 comprises an application for processing collected data to determine and provide events. In various embodiments, event detection application 310 uses data thresholding, data pattern matching, neural networks, machine learning, and/or any other appropriate method for determining events. Event detection application 310 utilizes operating point information for detecting events. For example, the operating point comprises trigger thresholds (e.g., trigger levels and/or trigger profiles, etc.), behavior types to review (e.g., cell phone usage, eating, drinking, and/or drowsy driving, etc.), behavior severity associated with a behavior type, and/or custom events to review. Event detection application 310 additionally utilizes operating point information for providing events. For example, operating point information comprises upload parameters (e.g., a fraction and/or a number of events to upload per type of event, etc.). Other applications 312 comprises any other appropriate applications (e.g., a communications application, a chat application, a web browser application, a document preparation application, a data storage and retrieval application, a user interface application, a data analysis application, etc.). Vehicle event recorder 300 additionally comprises storage 314. Storage 314 comprises operating point data 316 and sensor data 318. Operating point data 316 comprises operating point data for configuring data collection, event detection, and/or event uploading. For example, operating point data comprises data parameters, trigger thresholds, behavior types to review, behavior severity associated with a behavior type, custom events to review, upload parameters, etc. Sensor data 318 comprises collected sensor data (e.g., sensor data collected by data collection application 308). Vehicle event recorder 300 additionally comprises memory 320. Memory 320 stores executing application data 322 comprising data associated with applications 306.

Figure 4:
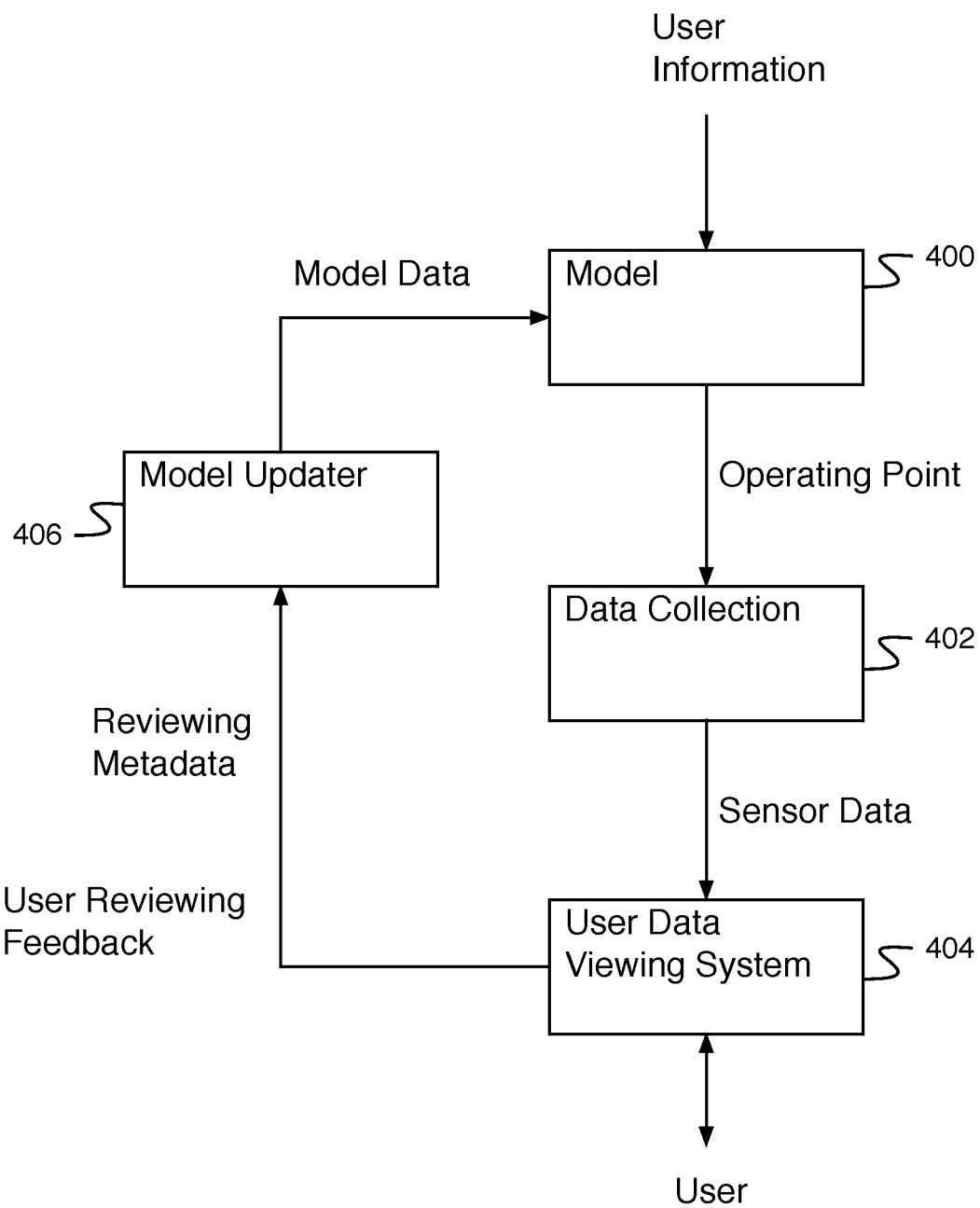
FIG. 4 is a block diagram illustrating an embodiment of model usage and updating.

FIG. 4 is a block diagram illustrating an embodiment of model usage and updating. In some embodiments, the block diagram of FIG. 4 shows data flow for operating point determination (e.g., by operating point model application 210 of FIG. 2), data collection, viewing, and updating. In the example shown, user information is provided to model 400. For example, user information comprises organization size, organization industry, organization typical hours of operation, organization geographical location of operation, organization largest expense types, organization vehicle types used, organization sector, and/or organization material types handled. Model 400 determines an operating point based at least in part on the user information. For example, model 400 determines an operating point additionally based on previous reviewing metadata and user reviewing feedback. The operating point determined by model 400 is provided to data collection 402. Data collection 402 utilizes the operating point for configuration of data collection, data processing, and data uploading. Data collection 402 collects data and provides data to user data viewing system 404. A user interacts with user data viewing system 404 to view data and to provide user reviewing feedback describing data view satisfaction. For example, user reviewing feedback comprises an event useful indication, an event portion useful indication, an event region useful indication, an event sensor useful indication, a marked behavior useful indication, and/or a trigger type useful indication. User data viewing system 404 additionally captures reviewing metadata as the user is viewing data. For example, reviewing metadata comprises an amount of time spent reviewing, a paused-on frame, a returned-to frame, an event highlighted or hovered over, and/or a data region focused on. User data viewing system 404 provides user reviewing feedback and reviewing metadata to model updater 406. Model updater 406 utilizes the overall user satisfaction represented by the data to determine model accuracy and trains a new model version using the model accuracy. Model updater 406 provides model data describing the new model version to model 400 for implementation.

Figure 5:
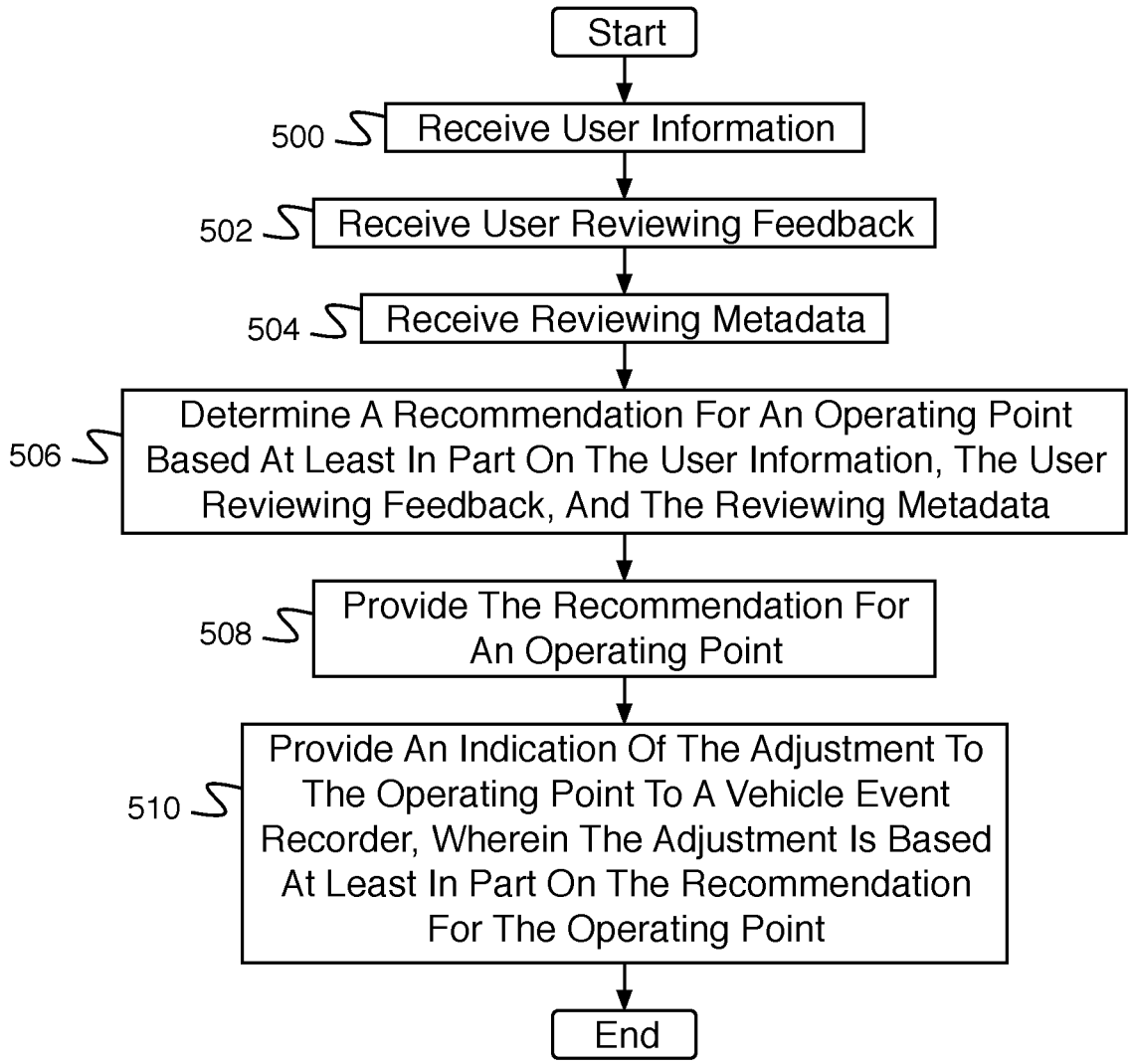
FIG. 5 is a flow diagram illustrating an embodiment of a process for indicating an operating point.

FIG. 5 is a flow diagram illustrating an embodiment of a process for indicating an operating point. In some embodiments, the process of FIG. 5 is executed by vehicle data server 104 of FIG. 1. In the example shown, in 500, user information is received. In 502, user reviewing feedback is received. In 504, reviewing metadata is received. In some embodiments, the user information, the user reviewing feedback, and the reviewing metadata are stored—for example, in model data storage or memory (e.g., model data storage 216 of FIG. 2). In 506, a recommendation for an operating point is determined based at least in part on the user information, the user reviewing feedback, and the reviewing metadata. In 508, the recommendation for an operating point is provided. For example, the recommendation for an operating point is provided to a user system (e.g., for display so that a user can review). In some embodiments, an indication of an adjustment to the operating point is received from the user system (e.g., from the user, in response to the recommendation for the operating point, a user indicates or selects an operating point to the system).

In 510, an indication of the adjustment to the operating point is provided to a vehicle event recorder, wherein the adjustment is based at least in part on the recommendation for the operating point. The indication of the adjustment to the operating point is determined automatically (e.g., in response to the recommendation for an operating point) or the adjustment is determined manually (e.g., selected by a user after being provided the recommendation for the operating point). For example, providing an indication of the adjustment to the operating point to the vehicle event recorder comprises causing adjustment to the operating point of the vehicle event recorder (e.g., the vehicle event recorder is configured to adjust its operating point in response to the indication of the adjustment to the operating point).

Figure 6:
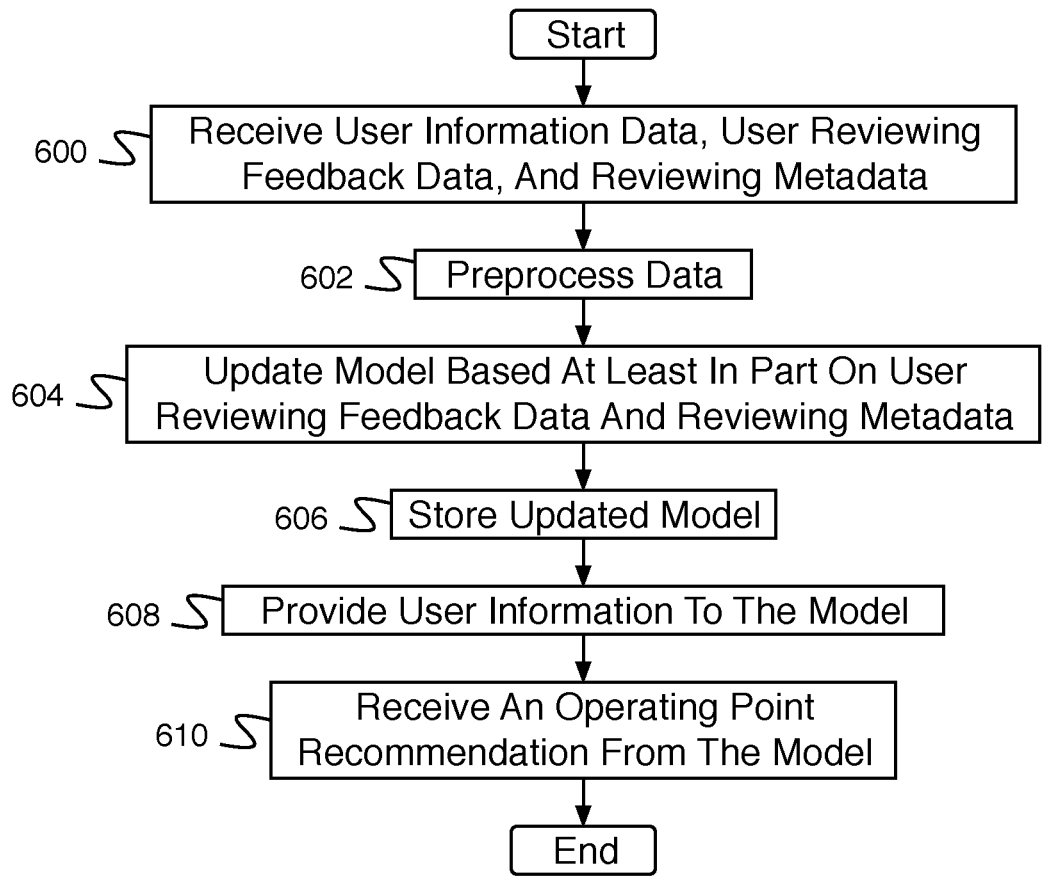
FIG. 6 is a flow diagram illustrating an embodiment of a process for determining a recommendation for an operating point based at least in part on user information, user reviewing feedback, and reviewing metadata.

FIG. 6 is a flow diagram illustrating an embodiment of a process for determining a recommendation for an operating point based at least in part on user information, user reviewing feedback, and reviewing metadata. In some embodiments, the process of FIG. 6 implements 506 of FIG. 5. In the example shown, in 600, user information data, user reviewing feedback data, and reviewing metadata are received. In 602, the data is preprocessed. For example, the data is filtered, combined, aggregated, applied to a function, etc. Data is preprocessed into useful variables or predictors for machine learning. This is sometimes an optional step and is often referred to as feature engineering. In some embodiments, the preprocessing applied to the data comprises some sort of transformation that preserves the original meaning of the variable (e.g., renormalization, scaling, replacing values by quantiles, etc.). In some embodiments, the preprocessing applied to the data comprises a transformation of the data into a new feature space, where the components are more predictive of the target (e.g., principal component analysis, auto-encoders, etc.). In 604, the model is updated based at least in part on user reviewing feedback data and reviewing metadata. For example, user reviewing feedback data and reviewing metadata indicate previous model success or failure and this information is used to update the model. For example, the model comprises a machine learning model, a neural network, an algorithmic model, etc.

For example, a recommendation model is determined trained on previous user information, previous reviewing feedback, and previous reviewing metadata. The recommendation model is stored. When user information data, user reviewing feedback data, and reviewing metadata are received, an update to the recommendation model is determined by training on the received user information data, the received user reviewing feedback data, and the received reviewing metadata. In 606, the updated model is stored. For example, the updated model and/or updated model parameters are stored in a data storage unit. In 608, user information is provided to the model. For example, user information is received by the system from an event recorder, an event recorder sensor, or a vehicle sensor. In 610, an operating point recommendation is received from the model. For example, the model is fed the user information received—for example, current or new information from sensors—to produce new operating point recommendation(s).

Figure 7:
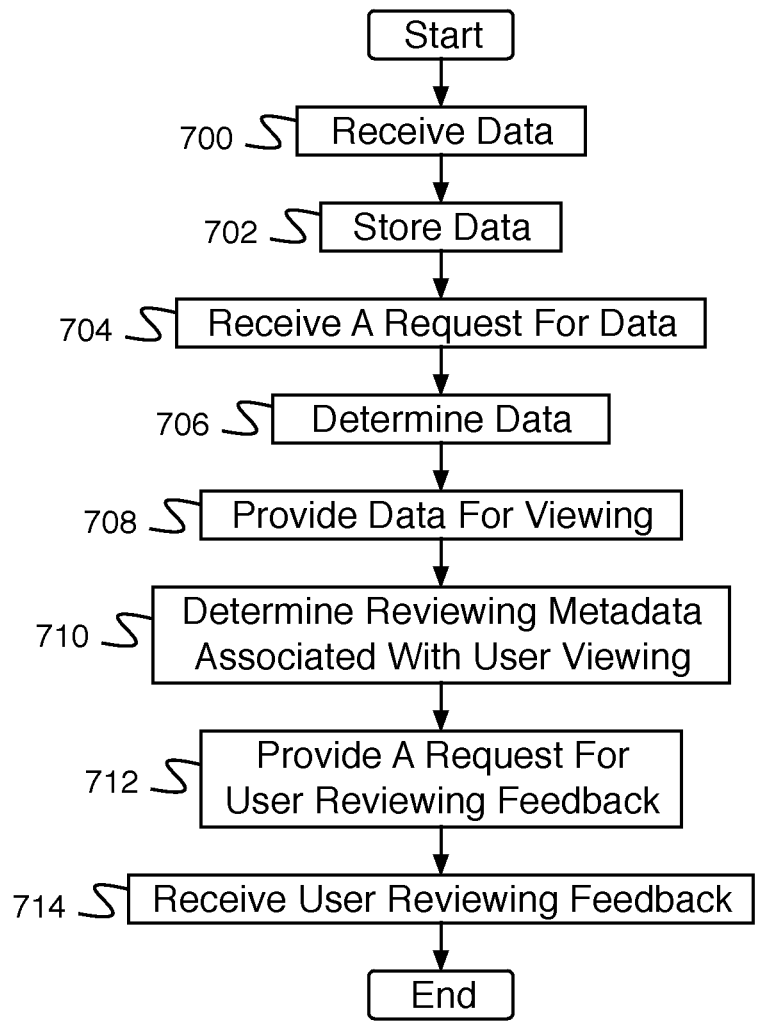
FIG. 7 is a flow diagram illustrating an embodiment of a process for data viewing.

FIG. 7 is a flow diagram illustrating an embodiment of a process for data viewing. In some embodiments, the process of FIG. 7 is executed by vehicle data server 104 of FIG. 1. In the example shown, in 700, data is received. For example, data is received at a vehicle data server from a vehicle event recorder via a network. In 702, data is stored. For example, the data is stored in a data storage unit. In 704, a request for data is received. For example, a user requests to view data from a vehicle event recorder. In 706, the data is determined. For example, data is determined from a set of received and stored data. In 708, the data is provided for viewing. For example, the determined data associated with the request is provided for viewing. In 710, reviewing metadata associated with user viewing is determined. For example, reviewing metadata is determined by analyzing user action(s) while viewing data (e.g., determining data that the user focuses on, data that the user rewinds to, data that the user skips, data that the user indicates is missing, etc.). In 712, a request for user reviewing feedback is provided. For example, a request for user reviewing feedback comprises a user feedback form (e.g. a set of questions provided to the user). For example, the request for user reviewing feedback is associated with an adjustment to an operating point (e.g., an adjustment to the operating point performed prior to the collection of the data received in 700). For example, the request is provided after data collected associated with the adjusted operating point is received (e.g., in 700). In 714, user reviewing feedback is received.

Figure 8:
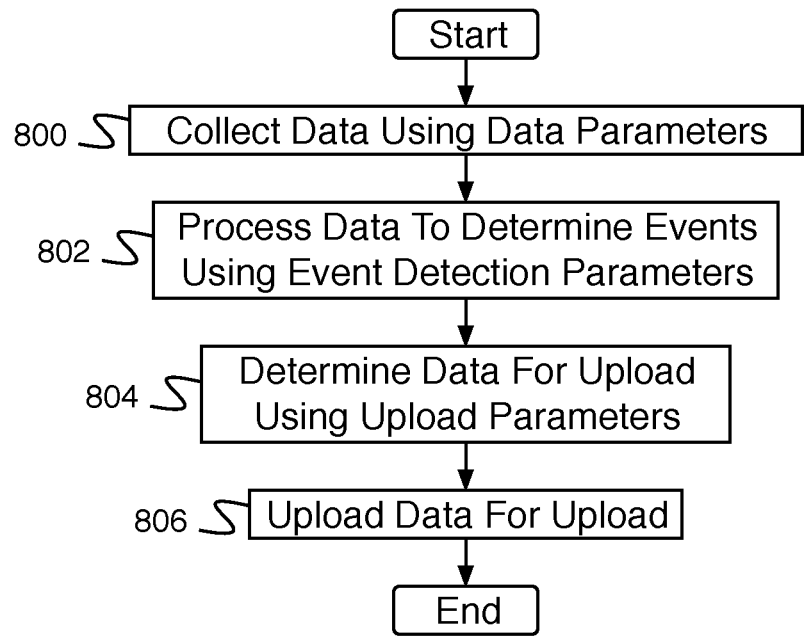
FIG. 8 is a flow diagram illustrating an embodiment of a process for collecting and providing data using an operating point.

FIG. 8 is a flow diagram illustrating an embodiment of a process for collecting and providing data using an operating point. In some embodiments, the process of FIG. 8 is executed by vehicle event recorder 102 of FIG. 1. In the example shown, in 800, data is collected using data parameters. For example, data is collected by a vehicle event recorder and its sensors or sensor associated with a vehicle that is attached to the vehicle event recorder. The vehicle event recorder is configured with data parameters. In various embodiments, the data parameters comprise data collection parameters, anomalous event detection parameters, data upload parameters, and/or any other appropriate parameters. In some embodiments, data parameters are set using an operating point controlled by the vehicle data server. In 802, the data is processed to determine events using event detection parameters. For example, sensor data is used and compared to thresholds or profiles to determine events that may be important or relevant to a user. In 804, data for upload is determined using upload parameters. For example, the data matching the upload parameters is uploaded to a data server from a vehicle event recorder. In 806, the data for upload is uploaded (e.g., to a vehicle data server). For example, the vehicle event recorder uses a transmitter to upload data via a network to a data server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for indicating an operating point, comprising:
   an interface configured to:
      receive user information;
      receive user reviewing feedback; and
      receive reviewing metadata; and
   a processor configured to:
      determine a recommendation for an operating point based at least in part on the user information, the user reviewing feedback, and the reviewing metadata; and
      provide an indication of an adjustment to the operating point to a vehicle event recorder, wherein the adjustment is based at least in part on the recommendation for the operating point.

2. The system of claim 1, wherein the operating point comprises a trigger threshold, wherein the trigger threshold comprises a trigger level or a trigger profile.

3. The system of claim 1, wherein the operating point comprises an upload parameter.

4. The system of claim 3, wherein the upload parameter comprises a fraction or a number of events to upload per type of event.

5. The system of claim 1, wherein the operating point comprises behavior types to review, wherein a behavior type of the behavior types is associated with a behavior severity for review.

6. The system of claim 5, wherein the behavior type of the behavior types comprises cell phone usage, eating, drinking, and/or drowsy driving.

7. The system of claim 1, wherein the operating point comprises custom events to review or data parameters.

8. The system of claim 7, wherein the data parameters comprise data length, data quality, or sensor type.

9. The system of claim 1, wherein the user information comprises organization size, organization industry, organization typical hours of operation, organization geographical location of operation, organization largest expense types, organization vehicle types used, organization sector, and/or organization material types handled.

10. The system of claim 1, wherein the user reviewing feedback comprises an event useful indication, an event portion useful indication, an event region useful indication, an event sensor useful indication, a marked behavior useful indication, and/or a trigger type useful indication.

11. The system of claim 1, wherein the reviewing metadata comprises an amount of time spent reviewing, a paused-on frame, a returned-to frame, an event highlighted or hovered over, and/or a data region focused on.

12. The system of claim 1, wherein the processor is further configured to store the user information, the user reviewing feedback, and/or the reviewing metadata.

13. The system of claim 1, wherein the processor is further configured to:
determine a recommendation model trained on previous user information, previous user reviewing feedback, and previous reviewing metadata; and
store the recommendation model.

14. The system of claim 13, wherein the processor is further configured to:
determine an update to the recommendation model by training on the user information, the user reviewing feedback, and the reviewing metadata; and
store the update to the recommendation model.

15. The system of claim 1, wherein the processor is further configured to cause an adjustment to the operating point of the vehicle event recorder.

16. The system of claim 15, wherein the processor is further configured to provide a request for a set of user reviewing feedback associated with the adjustment to the operating point.

17. The system of claim 16, wherein the request is provided after data collected associated with the adjusted operating point is received.

18. The system of claim 1, wherein the processor is further configured to preprocess the user information, the user reviewing feedback, or the reviewing metadata.

19. The system of claim 18, wherein preprocessing comprises combining data, aggregating data, filtering data, or applying a function to data.

20. The system of claim 1, wherein the adjustment is determined automatically.

21. The system of claim 1, wherein the adjustment is selected by a user after being provided the recommendation for the operating point.

22. A method for indicating an operating point, comprising:
receiving user information;
receiving user reviewing feedback;
receiving reviewing metadata;
determining, using a processor, a recommendation for an operating point based at least in part on the user information, the user reviewing feedback, and the reviewing metadata;
providing the recommendation for an operating point; and
providing an indication of the adjustment to the operating point to a vehicle event recorder.

23. A computer program product for indicating an operating point, the computer program product being embodied in a non-transitory computer readable storage medium and comprising computer instructions for:
receiving user information;
receiving user reviewing feedback;
receiving reviewing metadata;
determining a recommendation for an operating point based at least in part on the user information, the user reviewing feedback, and the reviewing metadata;
providing the recommendation for an operating point; and
providing an indication of the adjustment to the operating point to a vehicle event recorder.

* * * * *